US012776169B2

(12) United States Patent
Krishnakumar et al.

(10) Patent No.: US 12,776,169 B2
(45) Date of Patent: Oct. 27, 2026

(54) VEHICLE STATUS COMMUNICATION SYSTEM AND METHOD

(71) Applicant: TVS MOTOR COMPANY LIMITED, Chennai (IN)

(72) Inventors: Naveen Natarajan Krishnakumar, Chennai (IN); Sathiamoorthy Muralimanohar, Chennai (IN); Raghavendra Prasad, Chennai (IN); Datta Rajaram Sagare, Chennai (IN)

(73) Assignee: TVS MOTOR COMPANY LIMITED, Chennai (IN)

( * ) Notice: Subject to any disclaimer, the term of this patent is extended or adjusted under 35 U.S.C. 154(b) by 105 days.

(21) Appl. No.: 18/879,411

(22) PCT Filed: Dec. 13, 2022

(86) PCT No.: PCT/IN2022/051070
§ 371 (c)(1),
(2) Date: Dec. 27, 2024

(87) PCT Pub. No.: WO2024/003927
PCT Pub. Date: Jan. 4, 2024

(65) Prior Publication Data

US 2026/0004617 A1 Jan. 1, 2026

(30) Foreign Application Priority Data

Jun. 27, 2022 (IN) ............................ 202241036844

(51) Int. Cl.
*G07C 5/00* (2006.01)
*G07C 5/04* (2006.01)

(52) U.S. Cl.
CPC ............. *G07C 5/008* (2013.01); *G07C 5/004* (2013.01); *G07C 5/04* (2013.01)

(58) Field of Classification Search
CPC .......... G07C 5/008; G07C 5/004; G07C 5/04; G07C 5/0808; G07C 5/0833; H04L 67/12;
(Continued)

(56) References Cited

FOREIGN PATENT DOCUMENTS

KR 20180083073 A * 7/2018 ............... G09G 5/14

OTHER PUBLICATIONS

International Search Report issued in corresponding International Application No. PCT/IN2022/051070, dated Jan. 18, 2023 (3 pages).
(Continued)

*Primary Examiner* — Xiao En Mo
(74) *Attorney, Agent, or Firm* — Osha Bergman Watanabe & Burton LLP

(57) ABSTRACT

A system for communicating a vehicle status of a vehicle to a user of the vehicle includes a vehicle Bluetooth module located on the vehicle, a smart device, and a wearable device. The vehicle Bluetooth module is configured to send vehicle information pertaining to the vehicle status to the smart device. The smart device has a smart device data analytics module configured to analyse the vehicle information received and for generating a signal based upon the analysis. The signal is sent to the wearable device. The wearable device is configured to generate and play a specific predefined audio sound chosen from a set of predefined audio sounds for the user based upon the signal received.

14 Claims, 4 Drawing Sheets

(58) Field of Classification Search
CPC .. H04L 67/2869; H04L 67/2871; H04W 4/48; H04W 4/80
See application file for complete search history.

(56) References Cited

OTHER PUBLICATIONS

Written Opinion issued in corresponding International Application No. PCT/IN2022/051070, dated Jan. 18, 2023 (4 pages).

* cited by examiner

VEHICLE STATUS COMMUNICATION SYSTEM AND METHOD

FIELD OF THE INVENTION

The present invention relates to systems and methods for communicating a vehicle status of a vehicle and more particularly, to systems and methods for communicating the status of a vehicle to a user of the vehicle.

BACKGROUND OF THE INVENTION

Existing vehicles such as two-wheelers and three wheelers have a number of sub-systems interconnected for a smooth operation and running of the vehicle. The information pertaining to the working and functionality of these sub-systems is communicated and indicated to a rider/user of the vehicle using a rider display or by other vehicle parts.

Each of these sub-systems has sensors, transducers, and actuators for communicating the status of vehicle parts and components to a control unit and finally to the user. For example, when the rider is taking a turn, or is running low on fuel, an indication communicating these extra-ordinary conditions of these systems is provided to occupants/riders/users of the vehicle through graphical, illumination, haptic, audio medium and the like. The indications may be provided through a buzzer, a vibrating module installed on the vehicle and the like. For example, for illumination channel, a series of LEDs or different illumination level of LEDs may be used. Similarly, for indication through graphical channel, a text message or a graphical image may be used.

The sensors, actuators, lamps, and loads are connected across the vehicle through wires or through vehicle networks. The functionality of the features like direction, side stand status, low fuel alert and the like, are indicated through visual indication on a vehicle display or a display of rider's personal device connected to the vehicle. Besides, during riding conditions, the rider may not be looking at the display of rider's personal device while riding, so the text message, the graphical message and the illumination change can go unnoticed. During riding conditions, the vehicle status alert provided to the rider through visual means without an audio alert can go unnoticed.

It is also known to provide a separate buzzer unit, which indicates the vehicle occupant/rider/user about the vehicle status through audio means if available in the vehicle. However, the audio alert may also go unnoticed due to the traffic noise, wind noise or some other noises in the surroundings of the vehicle.

Besides, for audio feedback, there is a need of additional module on the vehicle. Similarly, for haptic feedback too, there is a need of additional module, which adds to the cost of the vehicle as well as need secured space in the vehicle. Also, during riding conditions, the vibration indication felt by rider will be minimal or may get unnoticed/may not be felt at all. This may be because the vehicle itself is vibrating while running or due to the rider wearing layers of clothes, due to which he/she is not able to feel the vibrations.

Further, if an audio indicating system is added to the existing systems of visual and haptic indication, it adds to the cost of the vehicle. Further, to ensure proper reception of the sound/audio to the rider's ear, the audio system should be placed optimally at a location in the vehicle to provide alert to the rider. Besides, in 2-wheeled vehicles and in some three-wheeled vehicles, space is a constraint for placing the sound generating means optimally so that it is heard easily by the rider. This issue is less in a 4-wheeled vehicle, especially because a 4-wheeled vehicle is generally a closed space, so sound can be easily heard in closed environment.

It may be appreciated that the existing systems working individually or even in combination are not able to properly and efficiently indicate information pertaining to vehicle status to the rider. Using combination of more than one system from audio, haptic and visual system, adds to the cost of the vehicle and the user may also get confused as to which indication/system he/she should be more conscious of: sound, touch/vibration, or visual text messages. This is discomforting and increases the rider/user effort, as well as may distract the rider, leading to safety concerns.

In a known prior art, a passenger car mechanism for preventing the operation of mobile phone by driver while driving the vehicle is suggested. With the advent of wireless wearable audio devices connectable to the mobile phones, the dangers associated with using mobile devices while riding/driving are obviated and thus such car mechanism for preventing use of mobile phones have become obsolete and are no more useful.

Thus, there is a need in the art for a system and method for communicating vehicle status information to a rider/user/occupant of the vehicle, which address at least the aforementioned problems.

SUMMARY OF THE INVENTION

In one aspect, the present invention is directed at a communication system for communicating a vehicle status of a vehicle to a user of the vehicle. The communication system comprises a vehicle Bluetooth module located on the vehicle, a smart device, and a wearable device. The vehicle Bluetooth module is configured for sending vehicle information pertaining to the vehicle status to the smart device. The smart device has a smart device data analytics module configured for analysing the vehicle information received and for generating a signal based upon the analysis. The signal is sent to the wearable device. The wearable device is configured to generate and play a specific predefined audio sound chosen from a set of predefined audio sounds for the user based upon the signal received. The smart device has an application module for receiving the vehicle information from the vehicle Bluetooth module.

In an embodiment, the system comprises a server for storing and analysing the vehicle information pertaining to a historical period of time. The server is configured to generate a vehicle behaviour signal based upon the analysis and sending the signal to the smart device. The smart device is configured to communicate the vehicle behaviour signal to the wearable device. The wearable device is configured for choosing and playing the specific predefined audio sound based upon the vehicle behaviour signal received. The application module is configured to send the vehicle information to the server over the historical period of time at predefined regular intervals.

In various embodiments, the vehicle information includes data pertaining to vehicle speed, vehicle rpm, battery voltage, vehicle range, sensors' data, and the like.

In an embedment, the smart device data analytics module is configured to compare the vehicle information with predefined values. The signal is generated based upon the result of the comparison.

In an embodiment, the vehicle has an instrument cluster. The vehicle Bluetooth module is located within the instrument cluster. The instrument cluster is configured to send the vehicle information to the smart device via the vehicle Bluetooth module. The vehicle has a plurality of sensors and a control unit. The instrument cluster is connected to the plurality of sensors via the control unit. The plurality of sensors sense and send the vehicle information to the control unit. The control unit is configured to send the vehicle information to the instrument cluster.

In an embodiment, the smart device has a smart device mobile Bluetooth module for communicating the signal to the wearable device.

In another aspect, the invention is directed towards a method for communicating a vehicle status of a vehicle to a user of the vehicle. The method comprises receiving, vehicle information at a vehicle Bluetooth module of the vehicle; sending, the vehicle information received at the vehicle Bluetooth module to an application module of a smart device; comparing, via a smart device data analytics module of the smart device, the vehicle information with predefined values; and generating and playing, via a wearable device, a specific predefined audio sound for the user of the vehicle. The specific predefined audio sound is chosen from a set of predefined audio sounds based upon a result of the comparing between the vehicle information and the predefined values.

In an embodiment, the method comprises: storing and analysing the vehicle information at a server over a historical period of time; generating, via the server, a vehicle behaviour signal based upon the analysis of the vehicle information stored; communicating, the vehicle behaviour signal to the user of the vehicle via the wearable device; and generating and playing, via the wearable device, the specific predefined audio sound chosen for the user based upon the vehicle behaviour signal.

In various embodiments, the receiving of vehicle information includes receiving data pertaining to vehicle speed, vehicle rpm, battery voltage, vehicle range, sensors' data, and the like.

In an embodiment, the method comprises: sensing and sending, via a plurality of sensors, the vehicle information to a control unit; and sending the vehicle information by the control unit to the vehicle Bluetooth module.

BRIEF DESCRIPTION OF THE DRAWINGS

Reference will be made to embodiments of the invention, examples of which may be illustrated in accompanying figures. These figures are intended to be illustrative, not limiting. Although the invention is generally described in context of these embodiments, it should be understood that it is not intended to limit the scope of the invention to these particular embodiments.

DETAILED DESCRIPTION OF THE INVENTION

The present invention relates to a system and method for communicating a vehicle status of a vehicle to a user. More particularly, the present invention relates to such systems and methods using auditory medium.

Figure 1:
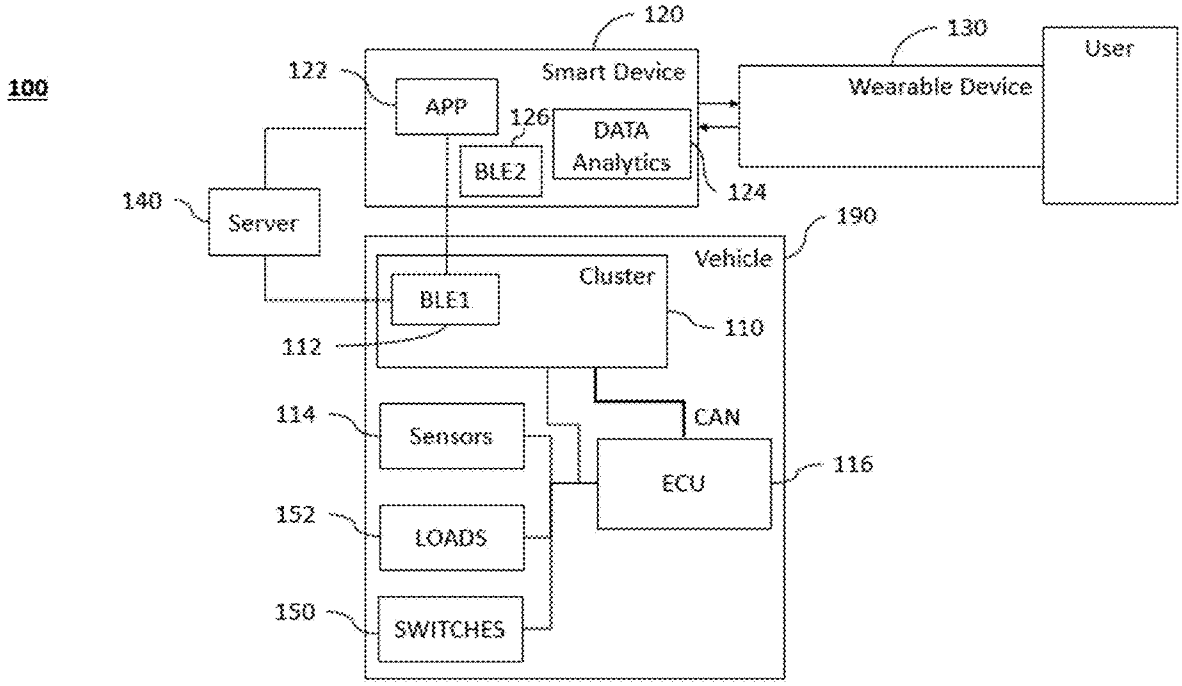
FIG. 1 illustrates a system for communicating a vehicle status of a vehicle to a user of the vehicle, in accordance with an embodiment of the invention.

FIG. 1 illustrates a system 100 for communicating a vehicle status of a vehicle 190 to a user of the vehicle 190, in accordance with an embodiment of the invention. The communication system 100 comprises a vehicle Bluetooth module 112 located on the vehicle 190, a smart device 120, and a wearable device 130. The vehicle Bluetooth module 112 is configured for sending vehicle information pertaining to the vehicle status to the smart device 120. The smart device 120 has a smart device data analytics module 124 configured for analysing the vehicle information received and for generating a signal based upon the analysis. The signal is sent to the wearable device 130. The wearable device 130 is configured to generate and play a specific predefined audio sound chosen from a set of predefined audio sounds for the user based upon the signal received.

As an example, the wearable device 130 is a Bluetooth enabled headphone, smart headset, earphone, ear pods, smart helmet, smart glasses, smart watches, smart band, smart jewelry, and the like. In an embodiment, the system 100 has more than one wearable device 130 for each user/occupant/rider of the vehicle 190. The smart device 120 is a portable/mobile device which has storage and processing capabilities. For example, the smart device 120 may be a mobile phone, a Personal Digital Assistance device, a smart cell phone, and the like. The set of predefined audio sounds may be a set of predefined distinct short audio files playable over a short duration of about two to ten seconds. The audio sound may be repeated for a certain duration repetitively over a period of a longer duration and/or until the user takes a certain specific action to snooze the sound or cancel the playing of the audio sound. Additionally, the predefined audio sound may be text to speech sound of an already existing text/warning message.

In an embodiment, the smart device 120 has an application module 122 for receiving the vehicle information from the vehicle Bluetooth module 112.

In another embodiment, the system 100 comprises a server 140 for storing and analysing the vehicle information over a historical period of time. The historical period of time may be of the order of a few months to a few years and includes the entire lifetime of the vehicle 190. The server 140 is configured for generating a vehicle behaviour signal based upon the analysis and for sending the signal to the smart device 120. The smart device 120 is configured to communicate the vehicle behaviour signal to the wearable device 130. The wearable device 130 is configured for choosing and playing the specific predefined audio sound based upon the vehicle behaviour signal received. The application module 122 is configured to send the vehicle information to the server 140 over the historical period of time at predefined regular intervals. The predefined regular intervals of time may be of the order of a few hours to a few days to a few weeks. The predefined regular intervals of time may be irregular for certain parameters of the vehicle information of the vehicle 190.

In various embodiments, the vehicle information includes data pertaining to vehicle speed, vehicle rpm, battery voltage, vehicle range, sensors' data, and the like. The vehicle 190 has a plurality of sensors 114 and a control unit 116. The plurality of 114 sensors may include a speed sensor for sensing a speed of the vehicle 190, a brake status sensor for sensing a status of a brake of the vehicle 190, a side stand status sensor for sensing a side stand status of a side stand, and the like.

In an embodiment, the smart device data analytics module 124 is configured to compare the vehicle information with predefined values. The signal is generated based upon the result of the comparison. For example, the speed sensor communicates the speed of the vehicle 190 to the data analytics module 124 located on the smart device 120. The data analytics module 124 compares the speed of the vehicle with predefined stored values and if the speed is more than a stipulated value, issues a warning signal to be communicated to the wearable device 130.

In another embodiment, the vehicle 190 has an instrument cluster 110. The vehicle Bluetooth module 112 is located within the instrument cluster 110. The instrument cluster 110 is configured to send the vehicle information to the smart device 120 via the vehicle Bluetooth module 112. The instrument cluster 110 is connected to the plurality of sensors 114 via the control unit 116. The plurality of sensors 114 sense and send the vehicle information to the control unit 116. The control unit 116 is configured to send the vehicle information to the instrument cluster 110. In another embodiment, the vehicle Bluetooth module 112 may be located anywhere within the vehicle 190.

In an exemplary embodiment, the instrument cluster 110 receives the vehicle information pertaining to the vehicle status from the control unit 116 such as vehicle controllers-ECUs (Electronic Controlled Units), which are responsible for computation of the information/data from sensors 114 and actuators and transmit the data via one or more communication channel (such as hardwire, CAN bus, wireless medium, and the like). The smart device Bluetooth module 112 present in the smart device 120, such as a smart phone, communicates with the instrument cluster 110 to receive the vehicle data and also communicates with connected gadgets (such as wearable device 130) to provide predefined audio sounds/audio feedbacks. The application module 122 such as a mobile application has the predefined values/threshold limits and based upon the comparison of the vehicle data with the threshold limits, the mobile application computes and provides relevant audio feedback to the rider through wireless wearables such as the wearable device 130.

As an example, the vehicle Bluetooth module 112 may be located in a speedometer. The speedometer/instrument cluster 110 is connected to other control unit 116 such as vehicle ECUs through CAN bus network. Vehicle control switches 150, vehicle sensors 114, lamps and loads 152 are connected to the speedometer through hardwire. The vehicle Bluetooth module 112 in the speedometer is connected to the mobile application 112 installed in the mobile phone (smart device 120) via Bluetooth. The mobile application 112 interacts with the wired/connected earphones, connected gadgets and transfers audio feedbacks to the rider of the vehicle 190.

In an embodiment, the smart device 120 has a smart device mobile Bluetooth module 126 for communicating the signal to the wearable device 130. The wearable device 130 may be connected to the smart device 120 through alternative communicating means such as Wi-Fi, Flex ray, NFC, Cellular networks, CAN, and the like. The wearable device 130 may be connected to the smart device 120 through hard wire. The smart device 120 is also configured to receive battery level of the wearable device 130 so as to keep check on the status of battery level of the wearable device 130 itself, so that if the battery level is less than a threshold, the same can be communicated to the rider of the vehicle 190.

Figure 2A:
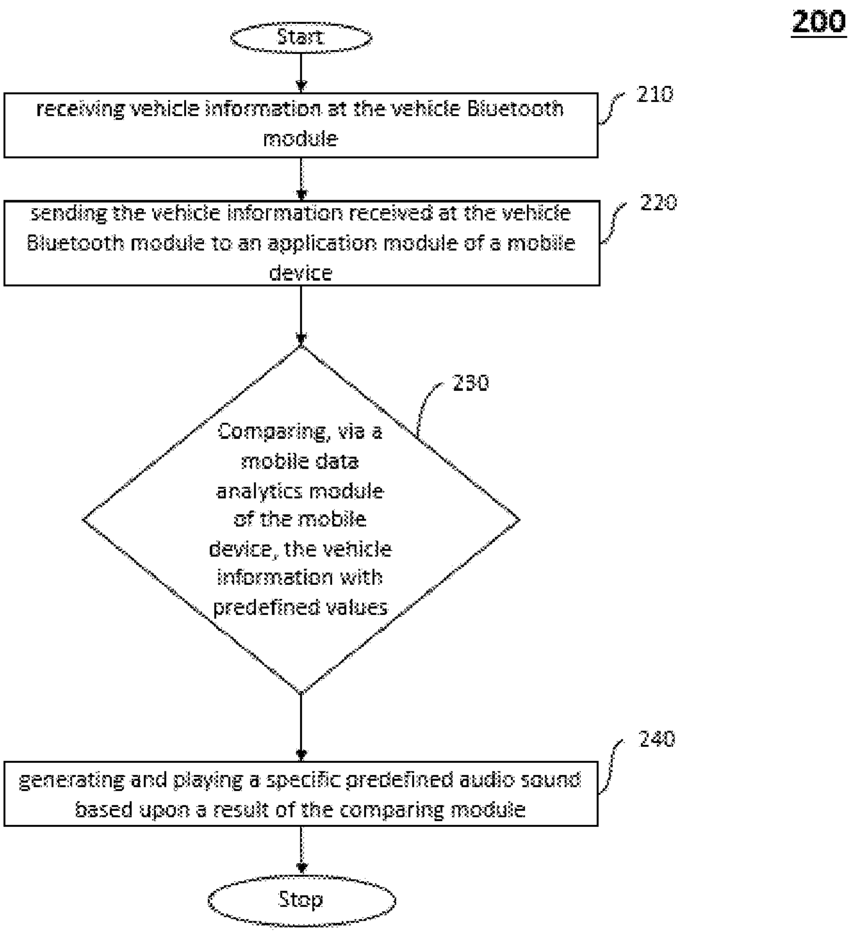
FIG. 2A is a flowchart illustrating a method for communicating the vehicle status of the vehicle to a user, in accordance with an embodiment of the invention.

FIG. 2A is a flowchart illustrating a method 200 for communicating the vehicle status of the vehicle 190 to the user, in accordance with an embodiment of the invention. The method 200 comprises steps 210, 220, 230 and 240. At step 210, the method includes receiving vehicle information at the vehicle Bluetooth module 112 of the vehicle 190. Subsequently: sending 220, the vehicle information received at the vehicle Bluetooth module 112 to an application module 122 of a smart device 120; comparing 230, via a smart device data analytics module 124 of the smart device 120, the vehicle information with predefined values; and generating and playing 240, via a wearable device 130, a specific predefined audio sound chosen from a set of predefined audio sounds for the user of the vehicle 190. The specific predefined audio sound being chosen based upon a result of the comparing 230 between the vehicle information and the predefined values.

The set of predefined audio sounds may be a set of predefined distinct short audio files playable over a short duration of about two to ten seconds. The audio sound may be repeated for a certain duration repetitively over a period of a longer duration and/or until the user takes a certain specific action to snooze the sound or cancel the playing of the audio sound. Additionally, the predefined audio sound may be text to speech sound of an already existing text/warning message.

In an embodiment, the receiving 210 vehicle information includes receiving data pertaining to vehicle speed, vehicle rpm, battery voltage, vehicle range, sensors' data, and the like.

Figure 2B:
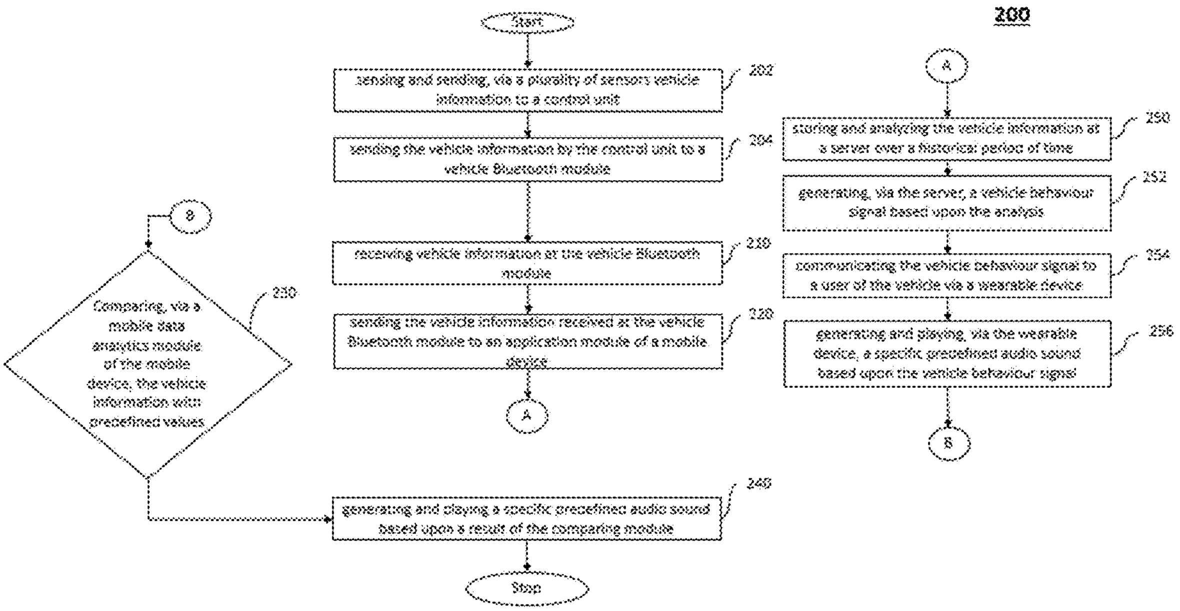
FIG. 2B is a flowchart illustrating the method for communicating the vehicle status of the vehicle to the user, in accordance with another embodiment of the invention.

FIG. 2B is a flowchart illustrating the method 200 for communicating the vehicle status of the vehicle to the user, in accordance with another embodiment of the invention. In this embodiment, the method 200 also comprises sensing and sending 202, via a plurality of sensors 114, the vehicle information to a control unit 116; and sending 204 the vehicle information by the control unit 116 to the vehicle Bluetooth module 112.

With reference to FIG. 2B, in another embodiment, the method 200 comprises steps 250, 252, 254 and 256. At step 250, the method includes storing and analysing the vehicle information at a server 140 over a historical period of time. Subsequently, generating 252, via the server 140, a vehicle behaviour signal based upon the analysis of the vehicle information stored; communicating 254, the vehicle behaviour signal to the user of the vehicle 190 via the wearable device 130; and generating and playing 256, via the wearable device 130, the specific predefined audio sound chosen for the user of the vehicle 190. The specific predefined audio sound is chosen based upon the vehicle behaviour signal. The predefined regular intervals of time may be of the order of a few hours to a few days to a few weeks. The predefined regular intervals of time may be irregular for certain parameters of the vehicle information of the vehicle 190.

Figure 3:
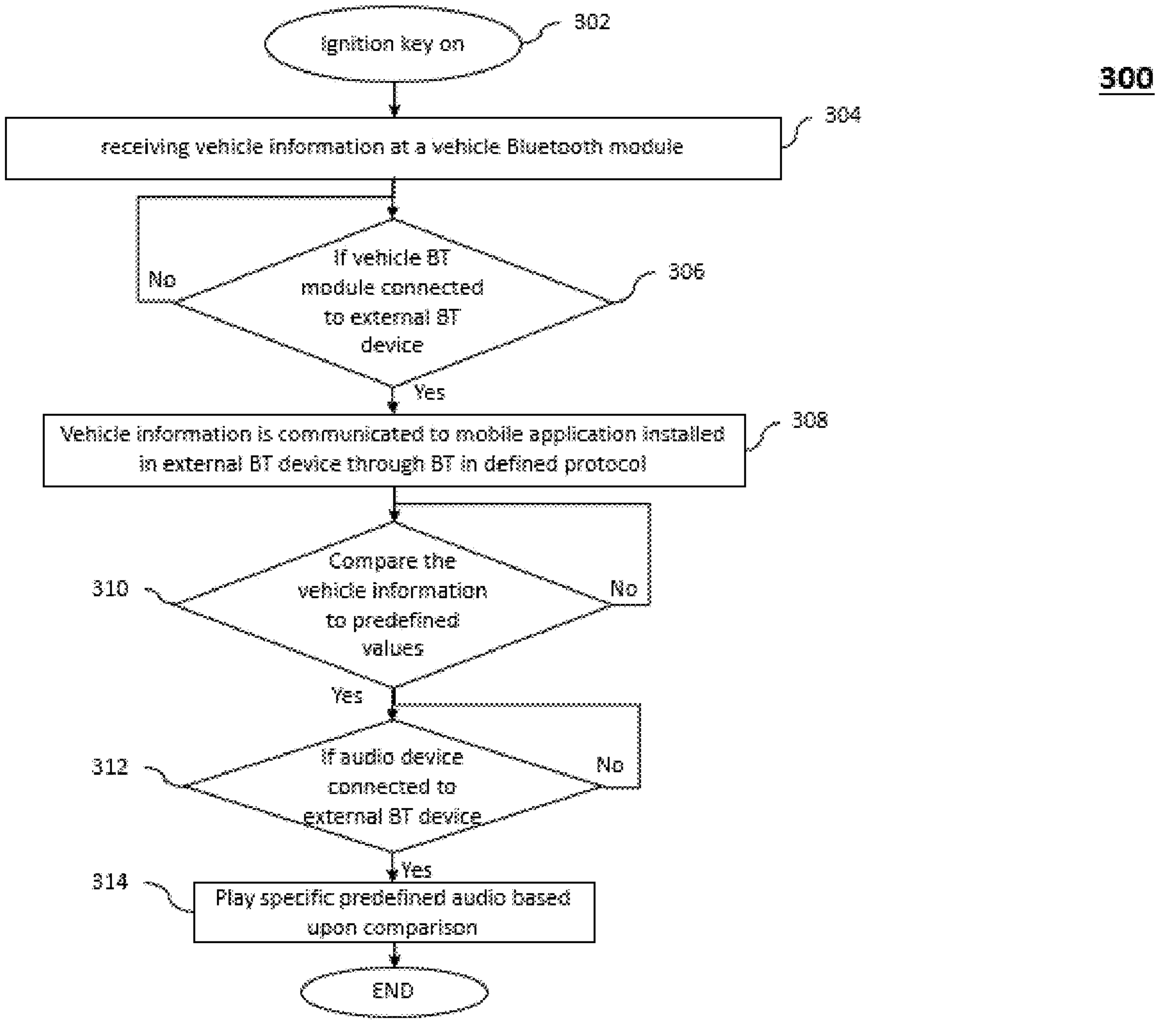
FIG. 3 is a flowchart illustrating an exemplary method for communicating the vehicle status of the vehicle to the user, in accordance with an embodiment of the invention.

FIG. 3 is a flowchart illustrating an exemplary method 300 for communicating the vehicle status of the vehicle 190, in accordance with an embodiment of the invention. At step 302, when the ignition of the vehicle 190 is switched ON, information pertaining to vehicle status is received at a Bluetooth module (such as vehicle Bluetooth module 112) located in the vehicle 190 at step 304. At step 306, the method checks if an external Bluetooth device (such as smart device 120) is connected to the Bluetooth module. At step 308, the vehicle information is communicated to a mobile application installed on the external Bluetooth device via Bluetooth protocol. At step 310, the method compares the vehicle information with predefined values and if a signal is generated based upon the comparison, at a subsequent step 312, if an audio device is connected to the external Bluetooth device, step 314 is performed. At step

314, a predefined audio is played through the wearable device based upon the signal of the comparison.

Advantageously, the systems and methods provided by the invention increases user/rider experience and comfort by providing real-time vehicle status information without distractions and without the installation or addition of additional parts/equipment to the vehicle. Besides, since the wearable device is on the person of the user/rider and is a dedicated auditory device, chances of missing the alert, which is quite probable in case of an open speaker on the vehicle, is obviated.

While the present invention has been described with respect to certain embodiments, it will be apparent to those skilled in the art that various changes and modification may be made without departing from the scope of the invention as defined in the following claims.

The invention claimed is:

1. A communication system for communicating a vehicle status of a vehicle to a user of the vehicle, the communication system comprising:

a vehicle Bluetooth module located on the vehicle;

a smart device; and a wearable device, wherein the vehicle Bluetooth module is configured to send vehicle information pertaining to the vehicle status to the smart device, the smart device has a smart device data analytics module, the smart device data analytics module being configured to analyse the vehicle information received and to generate a signal based upon the analysis, the signal being sent to the wearable device, and the wearable device is configured to generate and play a specific predefined audio sound chosen from a set of predefined audio sounds for the user, the specific predefined audio sound being chosen based upon the signal received.

2. The communication system as claimed in claim 1, wherein the smart device has an application module, the application module being configured to receive the vehicle information from the vehicle Bluetooth module.

3. The communication system as claimed in claim 1 further comprising:

a server that stores and analyses the vehicle information, the vehicle information pertaining to a historical period of time, the server generating a vehicle behaviour signal based upon the analysis, the vehicle behaviour signal being sent to the smart device.

4. The communication system as claimed in claim 3, wherein the smart device is configured to communicate the vehicle behaviour signal to the wearable device, the wearable device being configured to choose and playing the specific predefined audio sound based upon the vehicle behaviour signal received.

5. The communication system as claimed in claim 3, wherein an application module is configured to send the vehicle information to the server over the historical period of time, the vehicle information being sent at predefined regular intervals.

6. The communication system as claimed in claim 1, wherein the vehicle information includes data pertaining to vehicle speed, vehicle rpm, battery voltage, vehicle range, and sensors' data.

7. The communication system as claimed in claim 1, wherein the smart device data analytics module is configured to compare the vehicle information with predefined values, the signal being generated based upon a result of the comparison.

8. The communication system as claimed in claim 1, wherein the vehicle has an instrument cluster, the vehicle Bluetooth module being located within the instrument cluster, the instrument cluster being configured to send the vehicle information to the smart device via the vehicle Bluetooth module.

9. The communication system as claimed in claim 8, wherein the vehicle has a plurality of sensors and a control unit, the instrument cluster being connected to the plurality of sensors via the control unit, the plurality of sensors sensing and sending the vehicle information to the control unit, the control unit being configured to send the vehicle information to the instrument cluster.

10. The communication system as claimed in claim 1, wherein the smart device has a smart device mobile Bluetooth module for communicating the signal to the wearable device.

11. A method for communicating a vehicle status of a vehicle to a user of the vehicle, the method comprising:

receiving vehicle information at a vehicle Bluetooth module of the vehicle;

sending the vehicle information received at the vehicle Bluetooth module to an application module of a smart device;

comparing, via a smart device data analytics module of the smart device, the vehicle information with predefined values; and generating and playing, via a wearable device, a specific predefined audio sound chosen from a set of predefined audio sounds for the user of the vehicle, the specific predefined audio sound being chosen based upon a result of the comparing between the vehicle information and the predefined values.

12. The method as claimed in claim 11 further comprising:

storing and analysing the vehicle information at a server over a historical period of time;

generating, via the server, a vehicle behaviour signal based upon an analysis of the vehicle information stored;

communicating the vehicle behaviour signal to the user of the vehicle via the wearable device; and generating and playing, via the wearable device, the specific predefined audio sound chosen for the user of the vehicle, the specific predefined audio sound being chosen based upon the vehicle behaviour signal.

13. The method as claimed in claim 11, wherein the receiving vehicle information includes receiving data pertaining to vehicle speed, vehicle rpm, battery voltage, vehicle range, and sensors' data.

14. The method for as claimed in claim 11 further comprising:

sensing and sending, via a plurality of sensors, the vehicle information to a control unit; and sending the vehicle information by the control unit to the vehicle Bluetooth module.

* * * * *